July 1, 1969  C. L. LEHMAN  3,452,826
CULTIVATOR
Filed March 2, 1965  Sheet 2 of 5
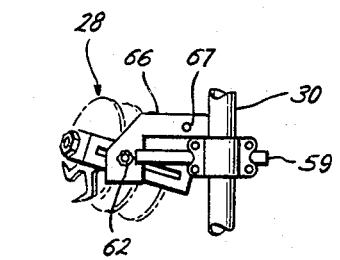
Fig. 3A
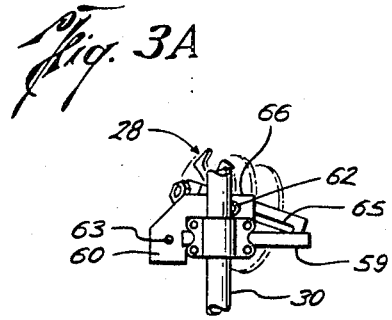
Fig. 3B
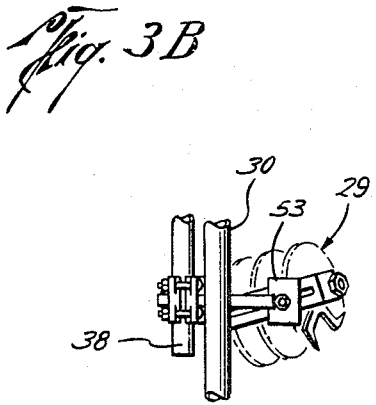
Fig. 4A
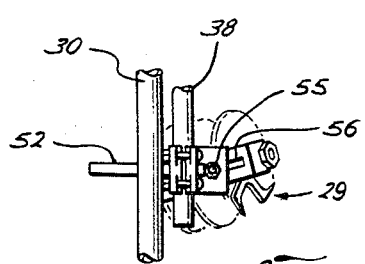
Fig. 4B
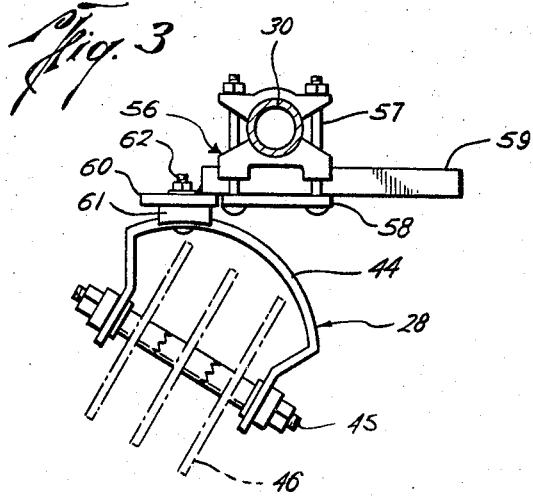
Fig. 3
Fig. 4
Charles L. Lehman
INVENTOR.
BY Browning, Simms, Hyer & Eckersoldt
ATTORNEYS

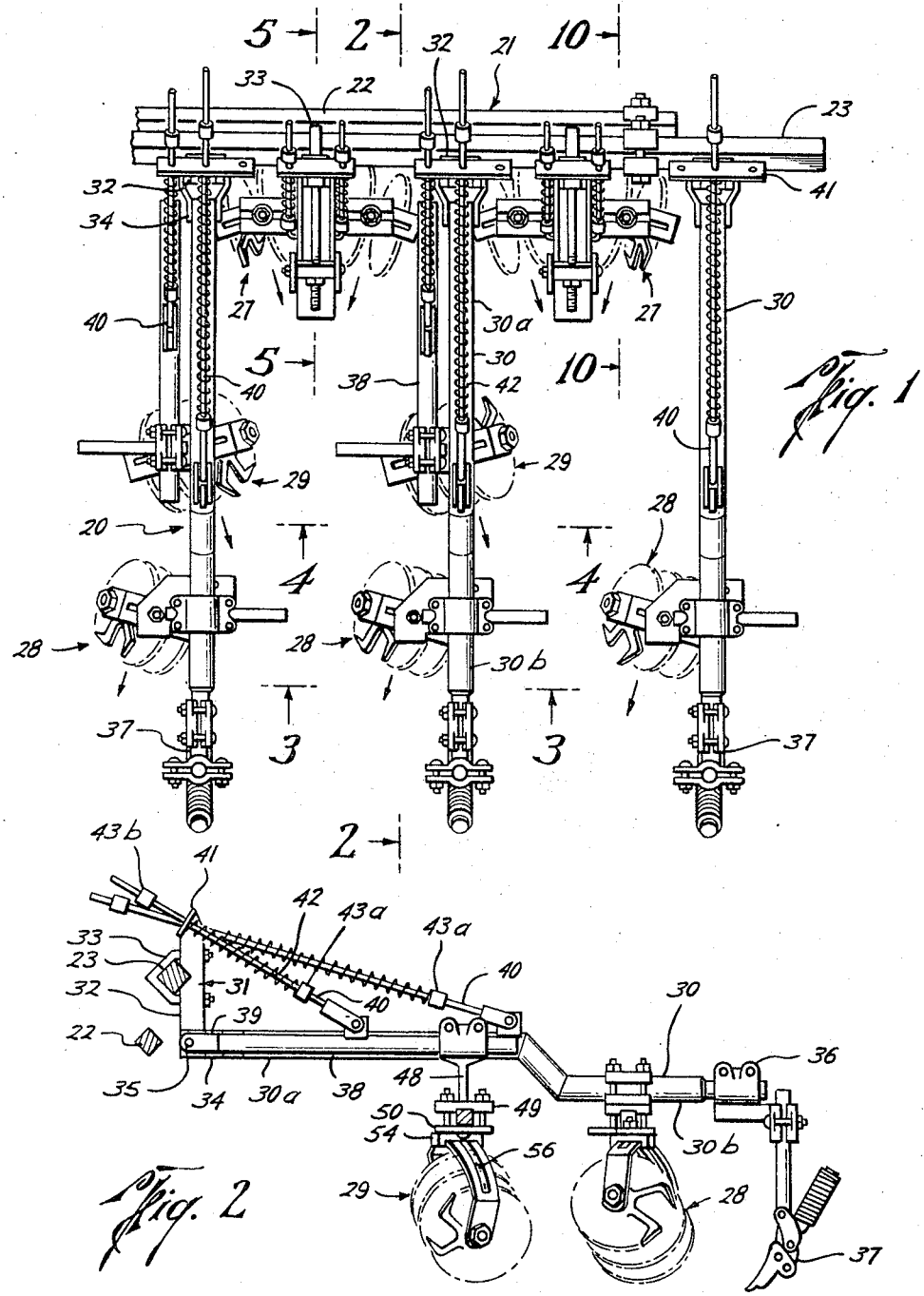

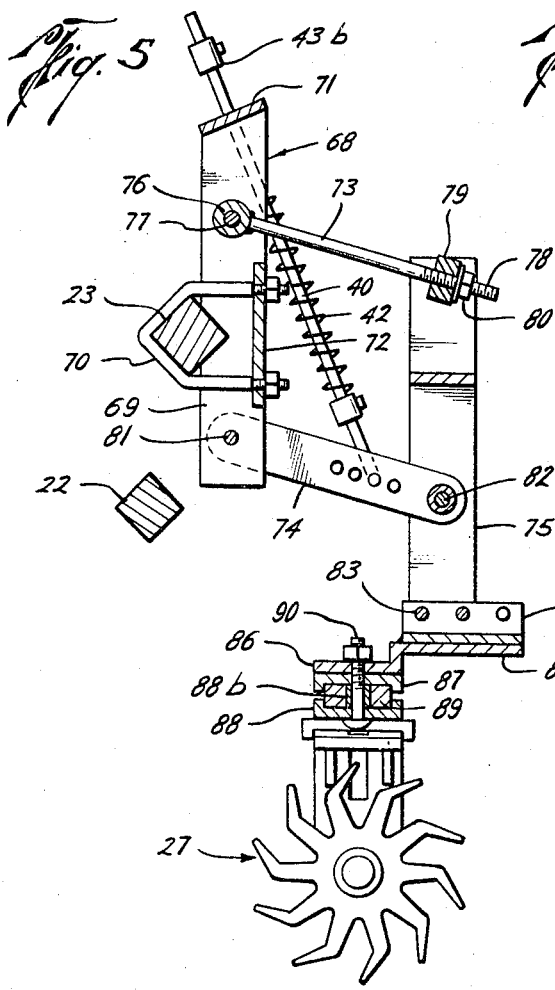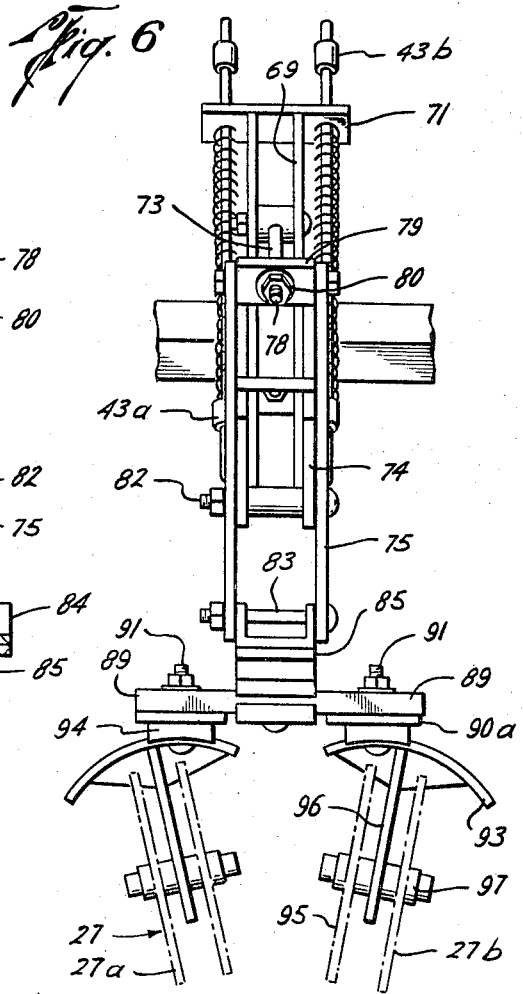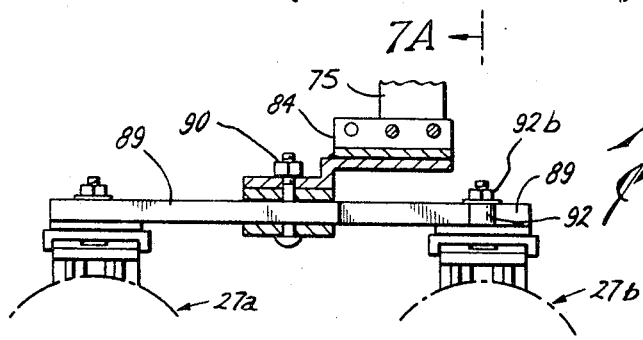

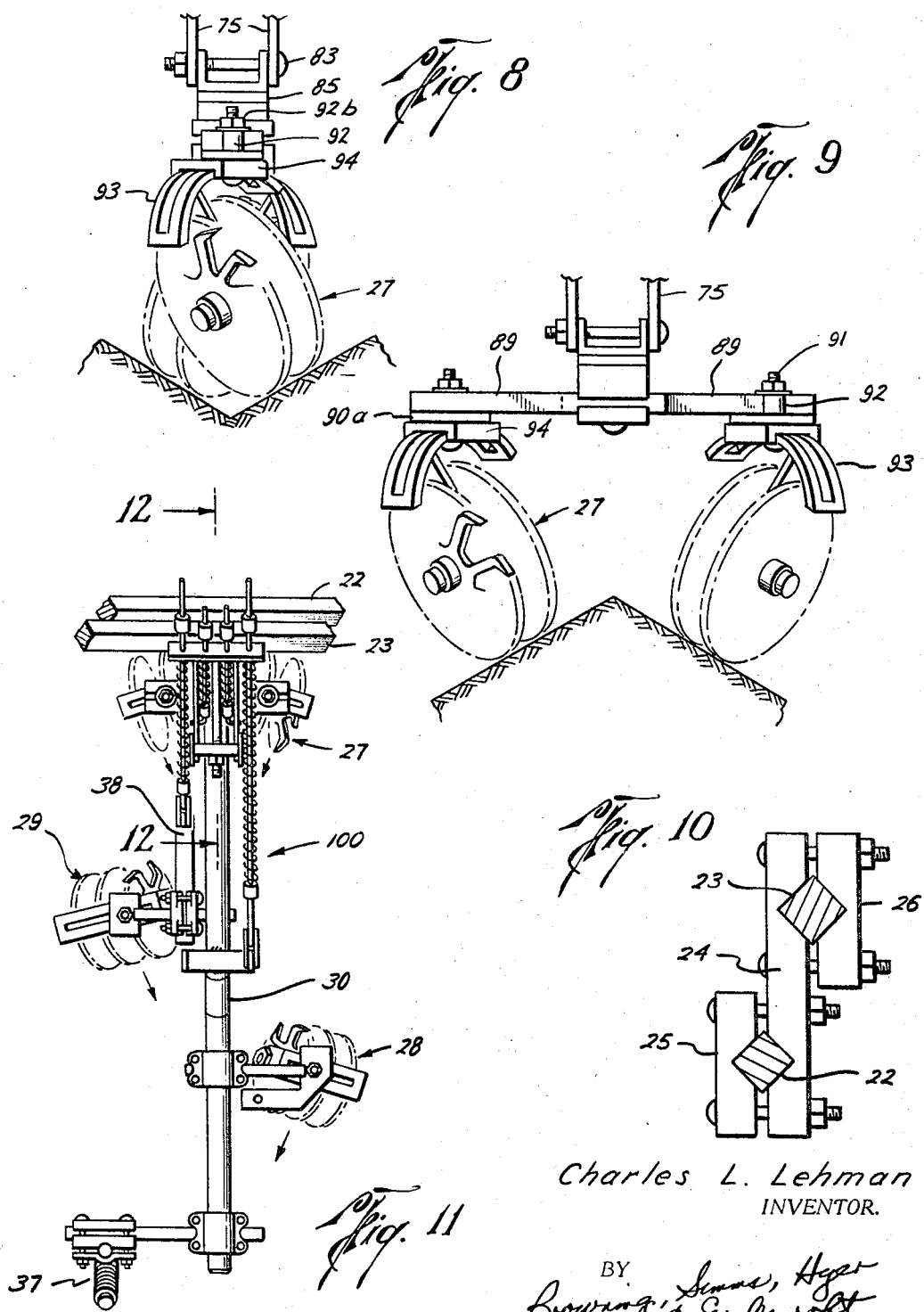

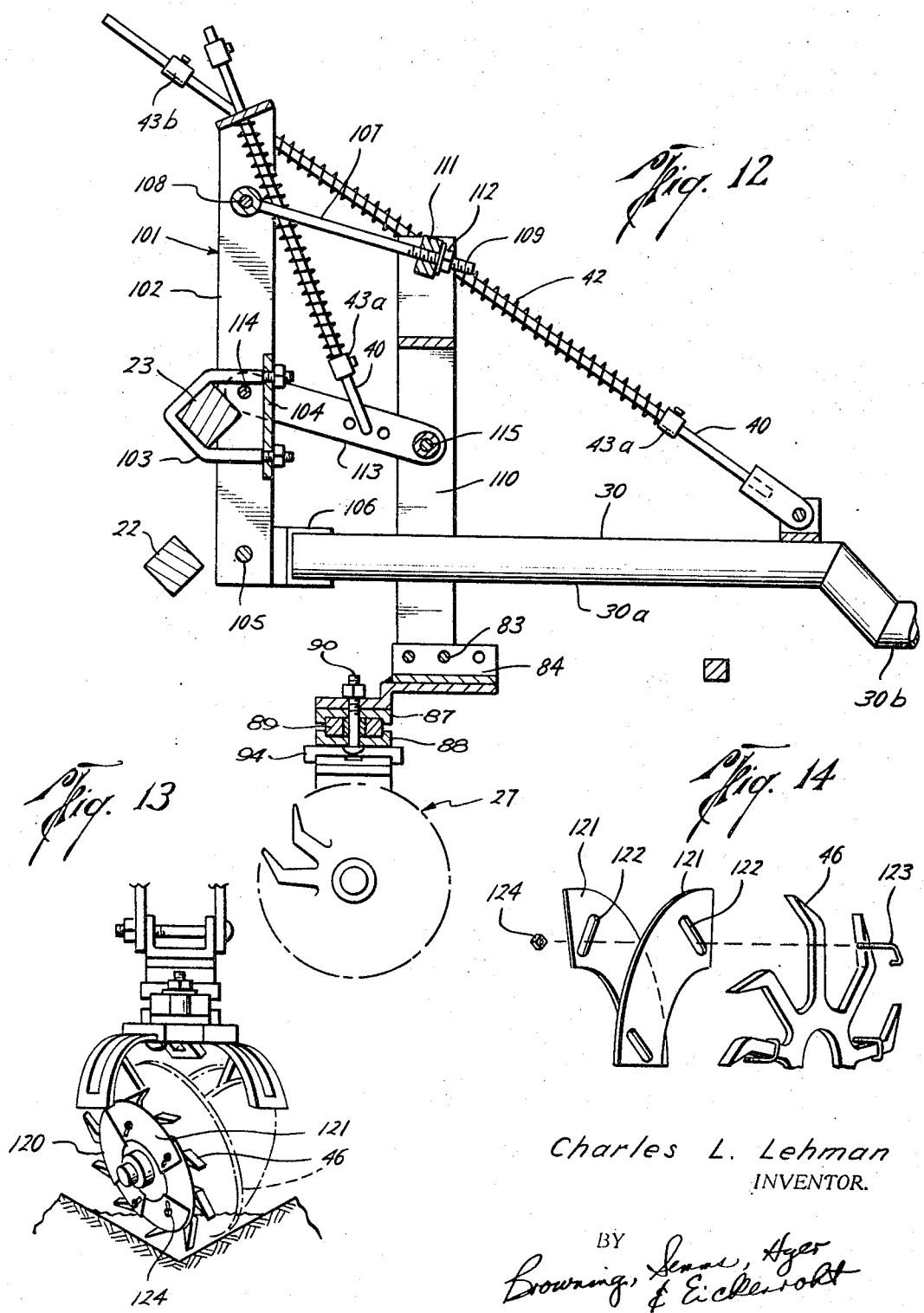

United States Patent Office 3,452,826
Patented July 1, 1969

3,452,826
CULTIVATOR
Charles L. Lehman, Rte. 3, Box 53,
Corpus Christi, Tex. 78415
Filed Mar. 2, 1965, Ser. No. 436,525
Int. Cl. A01b 21/02
U.S. Cl. 172—551                                         4 Claims

ABSTRACT OF THE DISCLOSURE

A cultivator comprising a frame including a laterally extending tool bar and brackets mounted along the length of the tool bar. In one embodiment of the cultivator, a front gang of rotary hoes is mounted on each alternate bracket for movement over a row crop, and a rear gang is carried on each of a pair of beams swingably carried from each of the other brackets for movement over the sides of the rows. In another embodiment, the front gang is mounted on each bracket, and a pair of beams each carrying a rear gang is mounted on the same bracket. In both embodiments, the beams extend in side-by-side and free-floating relation. The forward end of one of each pair of beams is longitudinally offset above the rearward end thereof on which the gang is mounted to permit the gang on the other beam of such pair to be disposed beneath it.

---

This invention relates in general to cultivators. In one of its aspects, it relates to improvements in cultivators of the type shown and described in Lehman et al. Patent No. 2,994,387. In another of its aspects, this invention relates to improvements in rotary hoe gang assemblies useful in such cultivators. In still another of its aspects, it relates to an improved rotary hoe.

In the cultivator shown in this prior patent, a set of three gangs of ground driven rotary hoes is mounted on a frame for cultivating each row of crops. One gang moves directly over the row while each of the other two move along a side of the row. The row gang is angularly adjustable so that as it breaks up the soil in and around the crop, it also removes weeds therefrom without damaging the roots of the crop. The side gangs follows the row gang and are angularly adjustable into positions for either throwing soil from the side of the row onto the weeds or pulling soil away from adjacent the crop. The side gangs are also tiltable from one side to the other for moving uniformly over the sides of the row, whether the crop is planted on top of the ridge or in the furrow.

Each gang of this cultivator has a bracket supporting an axle about which one or more of the rotary hoes or spiders are rotatably mounted. As well known in the art, each such rotary hoe comprises a hub having a central opening which fits over the axle and a plurality of fingers or pickers extending radially therefrom. The ends of the fingers terminate in a circular pattern and are driven by successive engagement with the ground as the frame is moved forwardly thereover. A gang is "angularly adjustable" in the sense that its axle may be swung in a horizontal plane and is "tiltable" in the sense that its axle may be swung in a vertical plane.

On some occasions, it may be desirable to remove the row gangs from the frame so that the cultivator can be used in merely working the sides of the row. On other occasions, it may be desirable to use only the row gangs, in which case the side gangs are removed from the frame. In any case, each gang is so mounted from the frame that it floats with respect to the others whereby each is free to follow the contour of the land.

Difficulties in the use of this cultivator as well as modifications thereof stem primarily from the need to cultivate narrow rows of crops, some of which may be no more than ten inches apart. Narrower gangs of hoes do not provide the answer, because there still may be interference between the free-floating supports for the various gangs. That is, in these prior cultivators, the side-by-side beams by which the gangs are swingably suspended from the frame make it impossible to get the gangs close enough together.

Another problem arises from the need to adjust the rear gangs laterally toward and away from one another when the cultivator is adapted to be used in widely spaced-apart as well as narrow rows. Of course, the spacing of the rows determines the center-to-center spacing of the front gangs, and the brackets for supporting these are first mounted along the length of a tool bar or other laterally extending frame member accordingly. The brackets for the beams for supporting the rear gangs are then mounted along the frame member according to the placement of the front gang brackets. In the event the rows are wide, the rear gangs for working the sides of adjacent rows will be moved apart a considerable distance. On the other hand, the rear gangs between narrow rows must be moved close together.

In the past, this adjustment has been accomplished by means of a slot in each rear gang which permits it to be moved laterally of its supporting beam. This, however, requires a long slot and thus a wide gang, which make it that much more difficult to use the cultivator on narrow rows, particularly when the gang must be tilted to some extent. Thus, in a modified form of this cultivator, the gang has been clamped about the axis of a round section of its supporting beam so that it may be pivoted thereabout. Obviously then, only a small angle of tilt has a considerable effect on its lateral tracking position.

Further difficulty has been encountered in working the crop by means of the front gang of prior cultivators of this type, particularly when the crop is tall. For this purpose, it has been proposed to split the front gang into two sections in order to straddle the crop. More particularly, in a modification of the cultivator shown and described in the prior patent, the sections of the front gang are laterally and longitudinally adjustable relative to one another and individually angularly adjustable to permit their front ends to be angled toward or away from one another. However, this has still not enabled all the desired operations to be performed, especially those close to the roots of the crop planted high on the ridge or deep in the furrow.

When the hoes of a gang are angled, they act much like a comb in slicing through the soil. Although they also move the soil to one side or the other, the volume so moved is generally small. Ordinarily, more soil movement is not required. In some cases, however especially after a hard rain, a large amount of soil may accumulate over the row crop planted in a furrow. In this event, more soil movement may be required before the hoe action can be beneficial. In other cases, it may be desirable to move more soil to or away from the crop than is possible with one pass of the rear gangs.

An object of this invention is to provide a cultivator of this type which may be used in cultivating narrower rows, and particularly in which gangs of given width may be moved closer together.

Another object is to provide such a cultivator in which the rear gangs may be laterally adjusted throughout a wider range.

A further object is to provide rotary hoe gang assemblies which provide greater flexibility in working the row crop, particularly in and around relatively tall crops.

Still a further object is to provide a rotary hoe gang assembly which is of simplified construction and which may be adjusted with a minimum of time and effort.

A still further object is to provide a rotary hoe of such construction that it may be used in moving a larger volume of soil.

These and other objects are accomplished, in accordance with the illustrated embodiments of the present invention, by a cultivator of this type in which beams for supporting adjacent rear or side gangs in free-floating relation to one another are swingably carried from a single bracket. In one such embodiment, these rear gangs are movable over opposite sides of the same row; and, in another such embodiment, they are movable over the sides of adjacent rows. In either case, the single bracket will provide considerably greater latitude in locating the rear gangs laterally of one another than will be provided by individual brackets for each such gang.

In the first-mentioned embodiment, a front or row gang is mounted from another bracket on the tool bar or other latrally extending frame member intermediate the brackets for the rear gangs. In the second-mentioned embodiment, the front or row gang is also carried on the single bracket from which the beams for the rear gangs are carried. More particularly, each such row gang is carried on a parallelogram linkage swingably connected to the one bracket and comprising an upper link above one of the beams for the rear gangs, a lower link beneath the one beam, and uprights connecting the links on opposite sides of such beam. The spaces between the linkage and the beam permits the one beam and rear gang thereon to float freely with reference to the linkage.

One of each pair of beams has a forward section nearer the bracket which is offset above a rearward section on which one of the rear gangs is mounted. This permits the adjacent rear gang to be mounted on the other beam for disposal beneath the raised section of the one beam, thereby further increasing the flexibility of the placement of the rear gangs laterally of the frame.

The clamp for mounting each rear gang from its beam includes a rod which is slidable laterally of the beam so as to in turn adjust the lateral postion of the gang. More particularly, the rod is reversible end-for-end so as to permit a lateral adjustment with respect to either side of the beam. The gang is in turn angularly and tiltably adjustable with respect to its clamp. Each such adjustment requires the manipulation of only a single bolt on the clamp.

The beam for mounting one of the adjacent rear gangs may be swingably mounted from the single bracket on either side of the beam for mounting the other rear gang. Preferably, this shiftable beam is the one on which the forwardmost of the rear gangs is mounted, because it is shorter and may therefore be moved easier than the other. The other gang is mounted on a plate of the clamp having bolt holes positioned therein for mounting the gang in alternate lateral positions, and particularly either beneath or to one such of such other beam. As will be understood from the detailed description to follow, these additional lateral adjustments compensate for what might otherwise be "blind" spots.

The sections of the front or row gang are so mounted on a parallelogram linkage pivotally carried from the bracket that they are not only adjustable laterally, forwardly and rearwardly, and angularly relative to one another, but also tiltable relative to one another and swingable between side-by-side and tandem positions. For this purpose, a clamp is suspended from the linkage by a pivot pin for swinging about a vertical axis, and each section of the gang is mounted on one of a pair of rods adjustable laterally of the clamp and longitudinally with respect to one another. Each section is curved downwardly and has a slot thereacross, and a bolt is carried from the end of each rod to extend through the slot for suspending the gang. Thus, upon loosening of the single bolt, the gang may be tilted from one side to the other and angled as desired. Also, upon loosening of the single bolt by which the clamp is suspended from the linkage, the clamp may be swung through 360° to permit the gang sections to be moved forwardly or rearwardly of one another. Loosening of this latter bolt also frees the rods for sliding laterally in the clamp.

In another embodiment of the invention, a disc is mounted on one side of at least one of the rotary hoes of a gang, so that such gang may be angled into a position in which the disc is on the front thereof. More particularly, the outer edge of the disc is arranged concentrically of the circular pattern of the outer ends of the hoes, and may cover the entire side of the hoe to provide a full disc action on the soil in the furrow, or only a portion thereof to provide a combination hoe and disc action. In the latter case, the outwardly extending ends of the hoe fingers act as a gauge to determine the depth of the disc penetration.

In a preferred form of this disc, such adjustment is made possible by a single disc made up of a plurality of segmental plates which are mounted on the side of the hoe for radial movement toward and away from the opening in the hub of the hoe. These plates overlap along adjacent side edges and have arcuate outer edges which form the variable outer diameter of the disc as the plates are moved radially.

In the drawings, wherein like reference characters are used throughout to designate like parts:

FIG. 1 is a top plan view of a cultivator constructed in accordance with the first-mentioned embodiment of the present invention;

FIG. 2 is a longiudinal sectional view of the cultivator shown in FIG. 1, as seen along broken line 2—2 thereof;

FIG. 3 is a cross sectional view of the cultivator of FIGS. 1 and 2, upon an enlarged scale and as seen along broken line 3—3 of FIG. 1, and showing the rear end of a rear gang on a long beam;

FIGS. 3A and 3B are top plan view of the gang shown in FIG. 3, upon the scale of FIGS. 1 and 2 and in alternate bolted position of the gang on the clamp therefor;

FIG. 4 is a cross sectional view of the cultivator, on the scale of FIG. 3 and as seen along broken line 4—4 of FIG. 1, and showing the rear end of a rear gang on the short beam;

FIGS. 4A and 4B are top plan views of the rear gang of FIG. 4, upon the scale of FIGS. 1 and 2 and in the alternate positions it assumes upon movement of the short beam from one side to the other of the long beam mounting rear gang of FIG. 3;

FIG. 5 is a longitudinal sectional view of one of the front or row gangs of the cultivator of FIG. 1, upon an enlarged scale and taken along line 5—5 of FIG. 1, together with the parallelogram linkage pivotally connected to the frame of the cultivator for mounting the front gang;

FIG. 6 is an elevational view of the rear end of the front gang and parallelogram linkage shown in FIG. 5;

FIG. 7 is a partial view of the gang and linkage of FIG. 5, with the clamp for the gang sections swung 90° from the position shown in FIG. 5, and with the rods supported on the clamp adjusted longitudinally of one another to space the gang sections further apart;

FIG. 7A is a cross sectional view of the gang shown in FIG. 7, as seen along broken line 7A—7A of FIG. 7;

FIG. 8 is a rear elevational view of the front gang similar to FIG. 6, but with the clamp and gang sections adjusted to positions for working close to the sides of a crop planted in the furrow;

FIG. 9 is another view similar to FIG. 6, but with the rods extended and the gang sections angled for working close to the sides of a crop on top of the row;

FIG. 10 is an enlarged sectional view of a portion of the frame of the cultivator, as seen along broken line 10—10 of FIG. 1;

FIG. 11 is a top plan view of part of a cultivator constructed in accordance with the second-mentioned embodiment of the present invention;

FIG. 12 is an enlarged longitudinal sectional view of the cultivator shown in FIG. 11, as seen along broken line 12—12 thereof;

FIG. 13 is a front elevational view of a row gang having a disc mounted on the leading hoe of its front section; and FIG. 14 is an exploded detailed view of the disc and hoe shown in FIG. 3.

With reference now to the details of the above described drawings, the cultivator shown in FIGS. 1 to 10, and designated in its entirety by reference character 20, comprises a frame 21 movable longitudinally over laterally spaced apart rows of crops—i.e., movable in an upward direction as shown in FIG. 1. More particularly, in this embodiment of the invention, the frame includes a first tool bar 22 adapted to be connected to a tractor or other towing vehicle in the usual manner, and a second tool bar 23 connected to the bar 22 and spaced above it. As shown in FIG. 10, the tool bars 22 and 23 are interconnected by a clamp having a common member 24 notched to receive both tool bars, a lower member 25 notched to receive the front end of bar 22, an upper member 26 notched to receive the back side of bar 23, and bolts connecting the common member to each of the upper and lower members above and below the tool bars. This adaptor mechanism is useful in permitting the brackets for the various gangs to be attached in any desired location laterally of the frame, regardless of the locating of the rods for connecting the tool bar 22 to the tractor.

As previously described, each front or row gang 27 mounted on the frame 21 is adapted to move over or at least close to the sides of the row crop, whether it be on top of the ridge or in the furrow. On the other hand, each of the rear or side gangs 28 and 29 is adapted to move over a side of the row. In the position of the cultivator 20 illustrated in FIGS. 1 and 2, the sections of the front gangs are tilted up to work in close to a crop planted on the ridge of each row, and the rear gangs are tilted up to work the sides of such rows. More particularly, the rear gangs are arranged in pairs, one gang 28 being movable over a side of one row and the other gang 29 of the pair being movable over the side of an adjacent row. Of course, at each end of the cultivator, as shown by the right-hand end thereof in FIG. 1, there is need for only one rear gang, in this case a gang 28.

As best shown in FIGS. 1 and 2, each rear gang 28 is mounted on a beam 30 which is pivotally connected at its forward end to bracket 31 of the frame for extension rearwardly therefrom in a generally longitudinally extending direction. The bracket includes spaced uprights 32 which are notched for clamping tightly to the rear side of tool bar 23 by means of a U-bolt 33. The forward end of the beam 30 has a stirrup 34 which fits over the outer sides of uprights 32 and is swingably connected to the lower ends thereof by means of pivot pin 35.

As best shown in FIG. 2, the forward end 30a of the beam 30 is raised or offset above the rearward end 30b thereof on which the rear gang 28 is mounted. More particularly, the beam comprises pipe sections welded or otherwise secured together to provide a configuration wherein, as shown in FIG. 1, the rear gang 29 can actually be disposed beneath the beam 30. It will also be noted that the adaptor tool bar 23 of the frame is useful in this regard since it enables the pivot pin 35 to be raised above the level which it would assume in the event the bracket was attached directly to the standard tool bar 22. The rear end of the beam 30 receives a clamp 36 upon which a standard plow 37 is mounted for movement in the furrow between the row crops. This, of course, explains the preference for the disposal of a rear gang 28 on the outer side of the cultivator 20.

As also best shown in FIGS. 1 and 2, each rear gang 29 is mounted on a beam 38 which is also swingably mounted from the bracket 31 for extension rearwardly therefrom in a generally longitudinally extending direction. More particularly, the beam 38 is shorter than the beam 30 so that it does not interfere in any way with the adjacent rear gang 28. Also, as previously indicated, the gang 29 is adapted to be disposed beneath the forward section 30a of the beam 30, so that the beam 38 need be no longer than that shown.

In the preferred construction, the forward end of the beam 38 has a narrow flange 39 extending from it so that it may be held against the outer side of stirrup 34 to receive the pivot pin 35 on the lower end of bracket upright 32 for swinging thereabout. Obviously, the beam 38 may be pivotally connected directly to the forward end of adjacent beam 30, because in this case both beams would still be swingably mounted from the same bracket 31. In either event, and as can be seen from FIG. 2, both beam 38 and beam section 30a are normally raised a considerable distance above the ground level to provide maximum head room for the adjacent front gangs.

The force with which each of the rear gangs 28 and 29 engages the side of the row may be adjusted by means of rods 40 pivotally connected at their rearward ends to the tops of the beams and received through openings in a flange 41 on the upper end of the bracket 31. More particularly, compression springs 42 surround each rod 40 intermediate a collar 43a on one end and the flange 41 on the other end. By proper placement of collars 43a on each rod, each gang may be urged against the ground with the desired force. Additional collars 43b on the rods forwardly of flange 41 provide a means by which the beams and gangs thereon are carried when lifted from the ground level.

If desired, one or more of the beams 38 may be moved from the left-hand side of the adjacent beam 30, as shown in FIG. 1, to the right-hand side thereof (see FIG. 4B). For this purpose, it is merely necessary to remove the pivot pin 35 so that the flange 39 may be disconnected from the left-hand side of the bracket 31. The beam 38 with the gang 29 thereon may then be lifted over onto the right-hand side of the beam 30, and the flange 39 reattached to the right-hand end of the pivot pin 35 adjacent the other outer side of stirrup 34.

The upper end of the generally U-shaped bracket 44 of each gang 28 and 29 is curved downwardly about a radius having its center at approximately ground level. The opposite sides of the bracket 44 extend downwardly from the upper end to provide journals for the ends of axle 45 upon which a plurality of rotary hoes or spiders 46 are mounted. Most of these rotary hoes are merely shown diagrammatically by broken lines indicating the circular pattern of the outer ends of their fingers. However, as shown in the solid line representations thereof, the outer ends of the legs of the spider are bent and turned forwardly at their point of engagement with the ground level. Thus, as the frame moves forwardly, these bent ends of the spider in effect "back hand" the soil.

The clamp 47 for mounting each gang 29 on a beam 38 comprises a hanger 48 having an upper end which is split to permit it to move over the round cross section of the beam 38 and then to be tightened thereon by means of a bolt. The lower end of the hanger 48 has a flange 49, and a plate 50 is suspended beneath the flange by means of bolts 51. Each of the flange and plate has notching grooves (see FIG. 2) to receive a non-circular and preferably square rod 52 between the bolts 51 for sliding laterally of the beam upon loosening of the bolt. Of course, upon tightening of the bolts after the rod has been suitably positioned relative to the beam 38, such rod will be fixed in a lateral direction.

As can be seen from FIG. 2, the height of the hanger 48 is substantially equal to the vertical offset between beam sections 30a and 30b. This in effect raises the level of the beam 38 above interference with the adjacent front gang, while at the same time permitting the gangs 28 and 29 to run on the same level.

As best shown in FIGS. 4, 4A and 4B, a flange 53 is welded to one end of the rod 52, and a plate 54 is supported beneath it by means of a bolt 55. More particularly, the upper end of the gang bracket 44 is suspended beneath plate 54 by the same bolt 55 which extends through a slot 56 across the upper end of the bracket. This lower plate has an arcuate groove (see FIG. 2) to receive the upper end of the bracket 44 so that, upon loosening of the single bolt 55, the bracket may be shifted within this groove so as to adjust the tilt of the rotary hoes 46.

The top side of plate 54 is flat and generally coplanar with the bottom side of the flange 53 so that, when the bolt 55 is loose, the plate and thus the bracket 44 suspended from it may be swung about a vertical axis. This, of course, permits the bracket 44 to be adjusted angularly with respect to the beam 38 and thus the direction of travel of the cultivator.

It will also be understood that upon loosening of bolt 55, the rod 52 may be reversed end-for-end to disposed plate 53 and thus gang 29 on one side or the other of the beam 38. As can be seen from FIG. 4, the plate 50 limits movement of the plate 53 and thus the rod 52 in opposite directions. Ordinarily, this would be thought to create a blind spot for placement of gang 29. However, the ability to move the beam 38 from one side or the other of the beam 30 overcomes any problem in this regard.

As previously indicated, the upper end of a bracket 44 is curved on an axis having its center at least approximately intersecting the ground level as determined by the lower ends of the rotary hoes 46. In this manner, the tilt of the gangs 28 and 29 may be adjusted without appreciable change in the tracking pattern of such hoes. This is not only useful in making a lateral adjustment of the rotary hoe, but also in reducing the width of the bracket necessary in supporting the hoes. Thus, in prior forms of this cultivator, adjustment of the tilt has resulted in a severe change of the lateral tracking position of the rotary hoes.

As best shown in FIG. 3, the clamp 56 for mounting each gang 28 from a beam 30 comprises split members held tightly about the beam 30 by means of bolts 57. A plate 58 is suspended beneath the lower member by means of the enlarged heads of the lower ends of the bolts 57, and the lower member and plate are formed with oppositely facing grooves (see FIG. 2) to receive a non-circular and preferably square rod 59 between the bolts similarly to the rod 52 of the clamp 47 for rear gang 29. Thus, upon loosening of the bolts 57, the rod is free to slide laterally of the beam 30, as illustrated by the positions thereof shown in FIGS. 3A and 3B. As in the case of the rod 52, it is also reversible end-for-end.

A flange 60 is welded to one end of the rod 59 and a plate 61 is suspended beneath the flange by means of a bolt 62 extending through a hole 63 in the plate (see FIG. 3B) in substantial alignment with rod 59. More particularly, the plate 61 has an arcuate groove in its lower side to receive the upper curved end of bracket 44 of the gang 29, and the bracket is suspended from the plate 61 by the enalrged lower end of the bolt 62 which extends through slot 56 in the bracket.

In addition, flange 60 has a wing 66 which extends along one side of the rod 59. There is a second hole 67 (see FIG. 3A) in this portion of the flange 60 to receive the bolt 62 for alternately mounting the gang 28 from the clamp beneath the beam 30. This adjustment permits correction of the same problem of a blind spot beneath the plate 58.

In general, this mounting of the gang 28 enables it to be adjusted in much the same manner as the gang 29. That is, loosening of the bolt 62 not only permits the gang to be tilted into a desired position, but also enables the plate 61 to be swung about a vertical axis so as to change the angular disposition of the hoes of the gang. However, the lateral position of the gang can be adjusted not only by loosening of the bolts 57 and sliding of the rod 59 within the clamp 56 about the beam 30, but also by transfer of the bolt 62 and the gang supported therefrom between holes 63 and 67.

The various ways in which the pairs of rear gangs 28 and 29 on adjacent beams 30 and 38 may be adjusted for use in narrow or wide rows will be apparent to one skilled in the art. For example, in the cultivation of narrow rows, as illustrated in the position of the gangs of cultivator 20 shown in FIG. 1, the gang 29 may work the side of a row to the right of the row worked by the gang 28, even though the beam 38 is mounted to the left of the beam 30. In this manner, of course, the gang 29 may be moved beneath the beam 30 inasmuch as the front section 30a of such beam is offset above the rear section 30b thereof upon which the gang 28 is supported. As shown in the drawings, each rear gang is tilted to work the side of a row on the ridge of which the crop is planted. Alternatively, the tilt of each of the gangs may be reversed so as to work the sides of rows in which the crop is planted in the furrow. Also, as shown in the drawings of FIGS. 1 and 2, the gangs 28 and 29 have each been angeled so as to throw dirt from the side of the row toward the crop, although this angular relationship may be reversed so as to actually pull dirt away from the row crop.

Obviously, when wide rows are being cultivated, and it is desired to provide a wide spacing between the pair of gangs 28 and 29, the beam 38 for supporting a gang 28 may be mounted on the right-hand side of the beam 30 so as to dispose the gang 29 in a lateral position to the right of that shown in FIG. 1. Also, of course, the rod 52 may be moved to the right widthin the clamp 47 so as to move the gang 29 that much further to the right. At the same time, of course, the rod 59 of the support for the gang 28 may be moved to the left so as to move such gang laterally to the left and that much further from the adjusted gang 29. In still other circumstances, it may be found desirable to mount the gang 28 directly beneath beam 30 in which case the bolt 62 is removed from the bolt hole 63 and moved to the bolt hole 67 with the gang bracket suspended therefrom.

As best shown in FIGS. 5 and 6, each front gang 27 is mounted from the tool bar 23 by a bracket 68 which comprises uprights 69 releasably mounted on the tool bar by means of a U-shaped clamp 70. As best shown in FIG. 6, the uprights 69 are connected by a plate 71 at their upper ends and a plate 72 intermediate their upper and lower ends, which also receives the ends of the clamp 70.

Upper and lower links 73 and 74, respectively, are pivotally connected at their forward ends between the uprights 69 and at their rearward ends between uprights 75. More particularly, and as can be seen from FIG. 5, the links 73 and 74 together with the uprights 69 and 75 form a parallelogram-type linkage for supporting the gang 27. As previously mentioned, and as will be described more fully hereinafter, each front gang 27 comprises a pair of gang sections which may be disposed in tandem, side by side, and any position therebetween. This parallelogram-type linkage enables the lower ends of the separate gang sections to be maintained at substantially the same horizontal level so as to uniformly engage the soil even though spaced longitudinally of one another.

If the front gang 27 is to move over a crop planted in the furrow, rather than on top of the ridge, the relationship of the links 73 and 74 of the parallelogram may need adjustment in order to maintain both sections of the gang on the same level. For this purpose, the upper link 73 has an eye 76 at its forward end for pivoting about a pin 77 extending between the spaced uprights 69 and the rearward end of the link 73 is threaded at 78 for reception through a threaded opening in the bar 79 extending between the upright members 75. A nut 80 is received over the outer end of the threads 78 to bear against the rear side of bar 79 and thus permit adjustment of the effective length of the link 73 as a part of the parallelogram linkage. The opposite ends of the other link 74 pivot about pins 81 and 82 journaled in upright members 69 and 75, respectively.

Each front gang is urged against the ground by a pair of devices identical to that used in connection with rear gangs 28 and 29, so that the illustration thereof bears identical reference characters. Thus, as shown in FIGS. 5 and 6, rods 40 extend from pivotal connections at their lower end to links 74 upwardly through plate 71. Coil springs 42 are compressed between the plate and adjustment collars 43a on the rod.

The lower ends of the rear uprights 75 of the parallelogram linkage are connected by bolts 83 to an upright channel 84. As shown in FIG. 5, the channel has a series of bolt holes along its length to permit it to be connected to the parallelogram linkage in adjusted longitudinal positions. A plate 85 welded to the lower side of the channel 84 has a forwardly extending flange 86 to receive a clamp to mount the sections 27a and 27b of the front gang 27 from the linkage.

This clamp includes an upper plate 87 and a lower plate 88 having grooves (FIG. 5) between which rods 89 for the gang sections 27a and 27b are slidable. The lower plate has a rib 88b extending along its central portion to separate the spaced rods 89 and to receive a bolt 90 for connecting the clamp members 86 and 88 together about the rods 89. Upon loosening of the bolt 90, each of the rods 89 may be moved in the plates so as to move the gang sections 27a and 27b toward or away from one another, and the plates 87 and 88 may be swung about a vertical axis to adjust the gang sections between the side-by-side position of FIGS. 5 and 6 to positions forwardly and rearwardly of one another, as shown in FIGS. 7 and 8.

There is a flange 90a welded to one side of the outer end of each rod 89, and a bolt hole extends through this flange adjacent the side of the rod 89 to receive a bolt 91 having an enlarged lower end. The bolt is suspended from the rod so as to in turn suspend each gang section 27a and 27b by means of a nut 92b and washer 92a thereabout. When the rods 89 are moved inwardly to the position shown in FIG. 6, the end of each moves beneath a washer 92. The washers are held in position to permit the rods to slide beneath them by means of sleeves or collars 92 of a slightly greater height than the thickness of the rods 89. Thus, these sleeves also transmit the force of the nut 92b to the enlarged lower end of the bolt 91.

As best shown in FIG. 6, bracket 93 for the hoes 95 of each gang section has a downwardly curved upper end with a slot thereacross to receive the lower end of the bolt 91. More particularly, the single bolt also extends through a plate 94 beneath flange 90a and having an arcuate groove on its lower side to receive the curved upper end of the bracket. Thus, upon loosening the bolt 91, the bracket can be swung in the groove of the plate 94 so as to adjust its tilt, and the plate 94 may be swung about a vertical axis with respect to the flange 90a so as to adjust the angular disposition of each gang section.

As shown, the gang bracket 93 has an arm 96 supporting an axle 97 for extension from opposite sides thereof. In the embodiment of the invention shown, a single rotary hoe 95 is rotatably supported on the axle 97 on each side of the arm 96. This particular construction of the bracket enables the gang sections to be moved that much closer to one another.

In FIGS. 6 and 9, the gang sections have been tilted into positions which are convergent in a downward direction so as to work in close to the sides of growing crops planted on a ridge. In some cases, it may be desired to swing the gang sections into a more upright position and then move them still closer together. In order to facilitate this, the arcuate slotted upper end of the bracket 93 is shorter on one end than on the other.

As previously mentioned, the plates 87 and 83 may be swung approximately 90° from the position shown in FIG. 5 to dispose one gang section forwardly of the other, merely upon loosening of the single bolt 90. At the same time, this loosening of the bolt 90 permits the rods 89 to be extended so as to separate the gang sections from one another. More particularly, the bolt 91 from which each gang section is suspended may be loosened to permit plate 94 to be rotated so that, as shown in FIG. 7, the axle 97 for each gang section may be moved into tandem. As shown in FIG. 8, when the gang sections are in substantial tandem positions, the leading one can be tilted in one direction, and the trailing one can be tilted in the other direction for working close to the sides of crops planted in a furrow.

As shown in FIG. 9, the rods 89 may be extended outwardly to permit the gang sections to work close to the sides of crops which may be so large as to be damaged by the close placement of the gang sections shown in FIG. 6. This figure also illustrates the swinging of the plate 94 for each gang section so as to adjust its angular disposition with respect to the forward travel of the cultivator.

As previously mentioned, in the embodiment of the invention illustrated in FIGS. 11 and 12, and designated in its entirety by reference character 100, the front gang 27 is mounted from the same bracket from which the beams 30 and 38 for the rear gangs 28 and 29, respectively, are mounted. As shown in FIG. 12, this bracket 101 is similar to both the bracket 31 of cultivator 20 for supporting the beams 30 and 38 thereof, and the bracket 68 for supporting the parallelogram linkage for the front gang 27 thereof. Thus, it includes spaced uprights 102 releasably attached to the tool bar 23 by means of a clamp 103 received through a bracing plate 104 on the rear intermediate portion of the uprights 102. As shown in FIG. 12, the forward end of beam 30 has a stirrup 106 thereon extending over the outer sides of the uprights 102 and swingably carried therefrom by means of a hinge pin 105 journaled between the lower ends of the uprights. As described in connection with the cultivator 20, the forward end of the beam 38 may also be swingably carried from this same hinge pin on either side of the beam 30.

External force may be applied to each of the beams 30 and 38 in the same manner as described in connection with cultivator 20 and identical reference characters are shown in FIGS. 11 and 12 for this purpose. In like manner, the gangs 28 and 29 as well as the clamps for supporting them on the beams 30 and 38, respectively, may be identical to those shown in connection with the cultivator 20, so that identical reference characters have also been used in this case.

As best shown in FIG. 12, the front gang 27 is supported from a parallelogram linkage similar to that shown in FIGS. 5 and 6 for the gang 27 of the cultivator 20. Thus, there is an upper link 107 having an eye at its front end pivotally mounted about a pin 108 extending between the uprights 102. The lower end of the link 107 is threaded at 109 for connection with the bar 111 extending between the opposite sides of uprights 110. More particularly, a nut 112 is received over the link 107 adjacent the rear side of the bar 110 so as to permit adjustment of the effective length of the link 107 in the parallelogram.

The lower links 113 are pivotally connected to the front uprights 102 by means of pivot pin 114 and to the rear uprights 111 by means of pivot pin 115. As explained in connection with the parallelogram linkage of FIGS. 5 and 6, the effective length of link 107 can be adjusted by means of the nut 112 in order to maintain the sections of the front gang 27 substantially parallel to the ground level which they engage. This is useful, as previously described, when one gang section is disposed forwardly of the other.

The gang 27 is mounted from the parallelogram linkage by a clamp which may be identical to that shown in FIGS. 5 and 6 and which therefore bears the same reference characters. Thus, the lower ends of the rear uprights 110 of the linkage, which are connected to the upright channel 84 by means of bolts 83, are disposed on opposite sides of the beam 30, the pivot pin 115 is spaced above the beam 30, and bolts 83 are spaced beneath it in the position of the gang 27 shown in FIG. 12. Of course, during operation of the cultivator 100, the gang 27, and thus the pins 115 and pins 83, may be higher or lower than the position shown. However, this spacing of the pins at least gives a wide range of clearance for the support for the gang 27 during normal operations. A desired amount of force is placed upon the front gang 27 by a mechanism identical to that shown in FIGS. 5 and 6. Although the single bracket 101 is shown and described as attached to the tool bar 23, it will be understood that, in a single row cultivator, this bracket could instead be connected to a conventional three point hitch or fast hitch. Thus, it would not be necessary to provide the tool bar or other laterally extending frame member to connect laterally spaced apart brackets, such as those shown in cultivator 20.

It will be noted that since the beam 38 of cultivator 100 is disposed over the row crop, the rods 52 and 59 have been extending outwardly of the clamps for the rear gangs 28 and 29 to dispose such gangs on the sides of the row. Also the plow 37 is carried on an offset clamp on the beam 38 so as to move in the furrow to the left of gang 29.

As shown in FIG. 13, the sections of a front gang 27 have been swung into generally the same positions they occupy in FIG. 8. That is, one section is disposed forwardly of the other section, and both sections are angled and tilted so as to engage the ground at least close to the crop planted in a furrow. In fact, in FIG. 13, the gang sections are adjusted to engage even closer to the furrow which, as indicated, is at least partially filled with relatively loose soil. As previously mentioned, this may result from a heavy rain. In any event, the layer of soil in the furrow makes it difficult if not impossible to work the crop planted therein with the usual hoe action.

Thus, a plate 120 is mounted concentrically on the front side of the leading hoe 46 of the front section of the gang 27 with its outer edge terminating radially inwardly of the ends of the fingers of the hoe. The projecting ends of the hoes act as a gauge in determining the depth to which the lower edge of the disc 120 will penetrate the soil which is piled up in the furrow. Obviously, if the outer edge of the disc were closer to the ends of the hoe fingers, the lower edge of the disc would penetrate deeper than shown. On the other hand, a shallower disc action could be obtained with the outer edge of the disc inwardly of that shown in FIG. 13. In addition to acting as a gauge, the outwardly projecting ends of the hoe fingers provide some hoe action in the soil beneath the level thereof established by the lower edge of the disc.

If desired, the outer edge of the disc may be of the same diameter as the circular pattern of the ends of the hoes; or, for that matter, of a greater diameter so as to project concentrically outwardly of such ends of the hoes. In this event, still greater disc penetration could be obtained, with the one or more of the other hoes of the gang 27 acting as a gauge. Such other hoes may include the other hoe of the front section of the gang as well as both hoes of the rear section of the gang. Alternatively, a disc 120 may be mounted on the front side of both hoes of the front section, with the hoes of the rear section acting as a gauge. In still other instances, the plate 120 may be mounted on one of the hoes of the rear section of the gang as well as over the front hoe of the leading section. Furthermore, it is contemplated that when one or more discs are employed in connection with a row gang of rotary hoes, they may have different diameters. This would make it possible, for example, to affect one level of penetration by means of the first disc and a deeper penetration by means of one or more succeeding discs.

If desired, a disc similar to disc 120 may be mounted on one or more rotary hoes of one or more of the rear gangs 28 and 29. In this event, the gang would move a greater volume of soil either toward or away from the row crop. Again, of course, the outer diameter of the disc would be chosen to provide the desired penetration of the soil, and thus the volume of the soil to be moved.

In either case, whether the disc be mounted on the hoes of the front gang or on the hoes of the back or side gangs, or for that matter whether they be mounted on both front and rear gangs, it is preferred that the disc be on the front side of the hoe. In this manner, the fingers of the hoe provide a framework which supports the disc and strengthens it against the forces of the soil as the disc moves through it.

If desired, discs of different sizes may be supplied in order to permit the operator of the cultivator to use them interchangeably on any given hoe. Preferably, however, a single disc 120 is constructed in the manner illustrated in FIGS. 13 and 14 so that it may be adjusted between positions in which its outer periphery is disposed radially inwardly of the the circular pattern of the ends of the hoe fingers or radially outwardly thereof. For this latter purpose, each disc comprises a plurality of segmented plates 121 which are mounted on the front side of a hoe 46 for movement radially toward and away from the opening in the hub of the hoe. When so mounted on the hoe, the plates overlap along adjacent side edges and have arcuate outer edges which form the variable outer diameter of the disc as the plates move radially.

The mounting for the plates comprises slots 122 therein for receiving J-bolts 123 adapted to hook over the back side of the finger of the rotary hoe. As will be understood from FIG. 14, the slots 122 in adjacent plates cross one another to form a common opening therebetween, and the threaded end of the J-bolt is extended through this common opening to receive a nut 124 which tightens its opposite hooked end over an intermediate back portion of one of the hoe fingers. Since the slots cross one another, they will, upon radial movement of the plates, move the common opening which receives the J-bolt in a radial direction. That is, when the plates are moved radially outwardly, this common opening will in turn move radially outwardly with the J-bolt received through it. Adjustment of the disc is therefore possible in an obvious manner.

From the foregoing, it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

I claim:

1. A cultivator, comprising a bracket having means thereon for mounting it on a laterally extending frame member adapted to be moved forwardly along laterally spaced row crops, a pair of beams, one of which is longer than the other, means swingably carrying the beams from the bracket for longitudinal extension from the bracket in side-by-side and free-floating relation to one another, said longer beam including a longitudinally extending forward end offset above a longitudinally extending and generally parallel rearward end, a pair of gangs or rotary hoes, means for mounting one gang on the rearward end of the longer beam, and means for mounting the other gang on the shorter beam beneath the forward end of the longer beam.

2. A cultivator of the character as defined in claim 1, wherein said beam carrying means includes means for mounting one of the beams along one or the other side of the other beam.

3. A cultivator of the character defined in claim 1, wherein said beam carrying means includes a hinge pin extending laterally through the bracket, and each beam is pivotally connected to said pin.

4. A cultivator, comprising a bracket having means thereon for mounting it on a laterally extending frame member adapted to be moved forwardly along laterally spaced row crops, a pair of beams, one of which is longer than the other, means swingably carrying the beams from the bracket for longitudinal extension from the bracket in side-by-side and free-floating relation to one another, a pair of gangs of rotary hoes, means mounting one of said gangs on the shorter beam for selective disposal beneath the longer beam, and means mounting the other of said gangs on the longer beam and rearwardly of the shorter beam for selective disposal in generally tracking relation to the gang on the shorter beam.

References Cited

UNITED STATES PATENTS

| | | | |
|---|---|---|---|
| 3,080,004 | 3/1963 | McNair | 172—600 X |
| 3,203,487 | 8/1965 | Whitesides | 172—548 |
| 3,209,840 | 10/1965 | Lehman | 172—600 X |
| 3,227,226 | 1/1966 | Bayne | 172—159 X |

FOREIGN PATENTS 1,080,075  12/1954  France.

ABRAHAM G. STONE, *Primary Examiner.*

ALAN E. KOPECKI, *Assistant Examiner.*